United States Patent [19]

Reimann et al.

[11] Patent Number: 5,132,137
[45] Date of Patent: Jul. 21, 1992

[54] PROCESS FOR THE PRODUCTION OF A LUMPY MEAT EMULSION PRODUCT

[75] Inventors: Josef Reimann, Kirchlintein-Hohenaverbergen; Tas Sirel, Verden-Walle; Eckhart Steinberg, Verden; Rolf Hornig, Kirchlintein-Luttum; Klaus Czempik, Minden; Friedrich Köhler, Martfeld-Loge, all of Fed. Rep. of Germany

[73] Assignee: Effem GmbH, Verden/Aller, Fed. Rep. of Germany

[21] Appl. No.: 671,860

[22] PCT Filed: Oct. 1, 1990

[86] PCT No.: PCT/DE90/00752
§ 371 Date: Apr. 2, 1991
§ 102(e) Date: Apr. 2, 1991

[87] PCT Pub. No.: WO91/04677
PCT Pub. Date: Apr. 18, 1991

[30] Foreign Application Priority Data

Oct. 4, 1989 [DE] Fed. Rep. of Germany ....... 3933528

[51] Int. Cl.[5] .................................................. A23P 1/00
[52] U.S. Cl. ..................................... 426/513; 426/518; 426/520
[58] Field of Search ................ 426/513, 518, 520, 511

[56] References Cited

U.S. PATENT DOCUMENTS 3,565,637  2/1971  Artar .................................... 426/518
4,752,492  6/1988  Sato et al. ........................... 426/513

Primary Examiner—George Yeung
Attorney, Agent, or Firm—Curtis, Morris & Safford

[57] ABSTRACT

A process for producing a lumpy meat emulsion product, in which the starting materials including proteins of predominantly animal origin are processed into a meat emulsion at temperatures below 55° C. The meat emulsion is forced through a gap between plates of a high speed emulsifier into a process tube and rapidly heated to within the range of approximately 40° to 75° C. such that relatively rapid coagulation of the emulsion material results.

14 Claims, 2 Drawing Sheets

PROCESS FOR THE PRODUCTION OF A LUMPY MEAT EMULSION PRODUCT

The present invention relates to a process for the production of a lumpy meat emulsion product, and more particularly, to a process for the production of a lumpy meat emulsion product wherein the starting materials are processed to a meat emulsion at temperatures below 50° C.

Meat emulsions have long been used to a considerable extent in the food product industry, and in particular, in the field of feeding domestic animals or pets. Utilization of a maximum proportion of meat raw materials, optionally combined with vegetable proteins, is required for animal feed as these constitute important nutrient carriers for protein, mineral substances, trace elements, fat and vitamins. Such meat emulsions are highly compatible and highly digestible for the animals, while at the same time being very tasty. Thus, these meat emulsions provide an optimum basis for an adequate nutrient adsorption by the animals.

A problem with typical meat emulsions for animal feed is that non-pretreated raw meat materials almost completely lose their lumpy nature and texture during the unavoidable sterilization process necessary to produce corresponding products. However, the shape, lump size, structure and firmness are basic constituents of a correct feeding and are essential factors for high animal acceptance and optimal feeding of the animal.

EP-OS 265 740 discloses a process for the production of a meat emulsion product, in which a meat emulsion of specific composition is rapidly heated to temperatures above 100° C. and preferably to temperatures between 104° and 118° C. At such temperatures, both the animal and vegetable proteins in the emulsion coagulate and denature at a very high speed. The hot emulsion is then pumped into a process tube, where it remains under an overpressure to complete the coagulation of the proteins. However, the premature coagulation and denaturing of the proteins in the emulsion has proved to be disadvantageous for nutrition-physiological reasons. Particularly, in such a production process, the meat raw materials lose texture and, with only moderate success, the known production process attempt to compensate for this by controlling the evaporation of the water present in the emulsion or additional injection of superheated steam for producing a layer-like structure. These process steps, however, are costly from both energy and labor standpoints.

Moreover, in the known process, an increase in the meat percentage in the emulsion to beyond 80% creates process control difficulties as it is easily possible to obtain an excessively fast coagulation of the emulsion. Such rapid coagulation, however, has certain disadvantageous effects on the texture. The aforementioned disadvantages of the known product also directly impair the animal acceptance thereof.

An object of the present invention is to provide a process for the production of a meat emulsion product, which avoids the aforementioned deficiencies of the prior art. It is also an object of the present invention to provide a process for the production of a lumpy meat emulsion product which is inexpensive and wherein the raw meat materials still remain usable as valuable nutrient carriers, particularly for highly digestible albumen as a result of animal-adequate lump size and bit stability, while simultaneously providing the possibility of enrichment with supplementary nutrients and the conversion thereof into an animal-adequate form.

According to the invention this problem is solved in that the meat emulsion is forced through a gap between the plates of a high speed emulsifier into a process tube and is rapidly heated to 40° to 75° C., wherein the proteins of the starting materials are predominantly animal origin and have different coagulation behavior characteristics with respect to temperature and time. With advantageous effects on the texture and other nutrition-physiologically important characteristics of the end product, a considerable proportion of the proteins having an animal origin present in the starting materials herein coagulate at temperatures between 40° and 75° C. and in a much shorter time than vegetable proteins. Thus, a partly coagulated emulsion material is obtained directly following insertion into the gap in the high speed emulsifier which has already solidified to such an extent which prevents the destruction of the sought product texture during further processing. The inventive effect, particularly on the product texture, is achieved by the temperature control incorporated herein, because excessively fast heating to still higher temperatures (as in the previously described prior art) leads to the excessively fast complete coagulation of the product wherein the product loses its nutrition-physiologically valuable characteristics, and moreover, it meat texture.

Compared with hitherto known products produced by the present invention, the resultant product is comparable to natural meat lumps, particularly with respect to the texture and, after sterilization, is superior thereto. Since, in addition, the starting products can even be exclusively animal-derived, a product is obtained, which has an extremely high animal acceptance which is superior to that of all known products.

In a preferred embodiment of the invention the gap between the plates of the high speed emulsifier is set to a width of 0.2 to 2 mm and preferably 0.6 mm.

In accordance with the present invention, the meat emulsion can also be heated to 50° to a temperature within the range of 65° C. in the high speed emulsifier. Heating preferably occurs by mechanical energy. In another embodiment, heating in the high speed emulsifier can be assisted by injecting superheated steam thereinto. The high speed emulsifier can include a fixed plate and a very rapidly rotating plate, between which the gap remains open. As a result of the viscosity of the emulsion material, which is dependent on the proportion of solid constituents, the pumping speed and the plate spacing, normally, adequately fast heating of the emulsion to the desired temperature is attained due solely to the resulting mechanical energy. However, if due to a change in the process conditions, mechanical energy is no longer adequate, the temperature can be further raised by a brief superheated steam injection. In order to obtain an optimum effect, the starting material should not coagulate too early, i.e. before insertion into or during containment in the high speed emulsifier. It is therefore necessary to retain the temperature of the starting materials until to the time of pumping into the high speed emulsifier below 50° C., and preferably below 35° C.

Advantageously, in order to attain the desired for the formation of the desired texture the emulsion material is fed into the process tube at a preferred speed within the range of between 0.5 and 3 m/min., and more preferably at a speed of approximately 1 m/min, and flows through the process tube for a residence time in the range of between 20 s and 20 min, and more preferably within the range of between 4 and 10 min.

The partly coagulated emulsion material in the process tube is continuously advanced by the re-pumping of meat emulsion through the high speed emulsifier, and passes out of the tube end as a thick strand.

According to another embodiment of the invention, the product discharged from the process tube is cut into strands or pieces by knife blades. The knife blades can be secured either within the end piece of the process tube or secured to the exterior surface of the discharge end of the process tube. This results in both a cutting of the large product strand in one dimension, i.e. into several small product strands, and subsequently, in another dimension, i.e., into correspondingly large product lumps.

According to another embodiment of the present invention, the cut product is heated in an oven to a core temperature within the range of 70° to 95° C. and more preferably, approximately 80° C. This additional step following the production process can be performed with the aforementioned thin product strands and with the already cut lumps. It is particularly advantageous to use a continuous baking oven, the product residence time therein being between 1 and 10 in. During the baking process in the oven further proteins contained in the product coagulate, preferably in the marginal area of the strands and/or lumps. The resultant product is extremely robust and stressable and permits easier handling of the product. This is particularly important with respect to the subsequent emptying, canning and sterilizing of the product.

According to a particularly preferred embodiment of the invention following the treatment in the oven, the product can be cut further. This packaging step is advantageously employed if strands still exist, as with this further cutting additional smooth cut surfaces are obtained. The lumpy meat emulsion product produced by the process of the present invention is clearly superior in texture and the associated improved bite stability and juiciness resulting from increased liquid retention. It is in particular pointed out that these advantageous product characteristics are not or are only slightly impaired by the subsequent sterilization process, which is contrary to the normal behavior of meat raw materials in the sterilization stage. Thus, a much higher animal acceptance for the end product can be achieved, which has been clearly proved by feeding tests. Thus, in a simple and inexpensive manner, the inventive process produces a product which, as a result of its formulation and texture, is comparable from the nutrition-physiological standpoint with natural meat lumps. The product can also be enriched with supplementary nutrients, such as valuable vegetable proteins, while converting the same into an animal-adequate form.

Further advantages and features of the invention, given by way of the following examples, but not intended to limit the invention solely to the specific embodiments described may best be understood in conjunction with the accompanying drawings in which.

EXAMPLE 1

| Formulation | % by weight |
| --- | --- |
| Meat and animal by-products | 90 |
| Animal protein | 10 |

Initially, all of the constituents are finely emulsified in a commercial cutter. The resultant viscous paste has a temperature within the range of approximately 30° to 35° C. as a result of the mechanical stressing. In order to avoid any partial denaturing or coagulation of the animal proteins, it is advantageous during this process stage to retain the meat emulsion temperature below 50° C. and more preferably below 35° C. The meat emulsion is then continuously pumped by means of a Mohno pump 1 at a pressure of approximately 4 to 5 bar into a high speed emulsifier 3, wherein the emulsion temperature rapidly rises to approximately 50° C. due to mechanical stressing. If the desired temperature cannot be achieved solely by mechanical energy, an inlet 5 for the injection of superheated steam into the emulsifier is provided.

Figure 1:
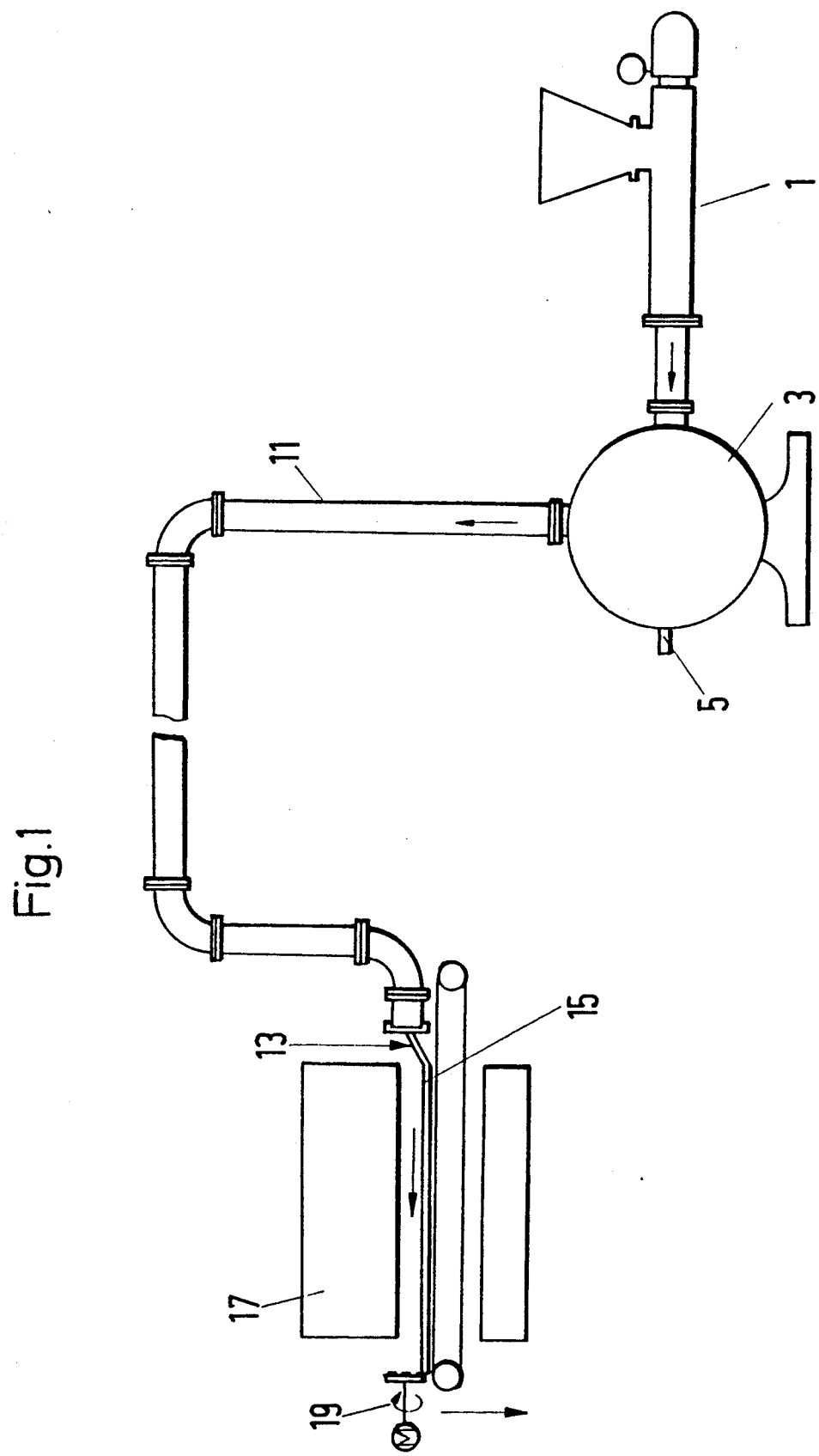
FIG. 1 is a process diagram of a preferred embodiment of the process for the production of a lumpy meat emulsion product of the present invention.
Figure 2:
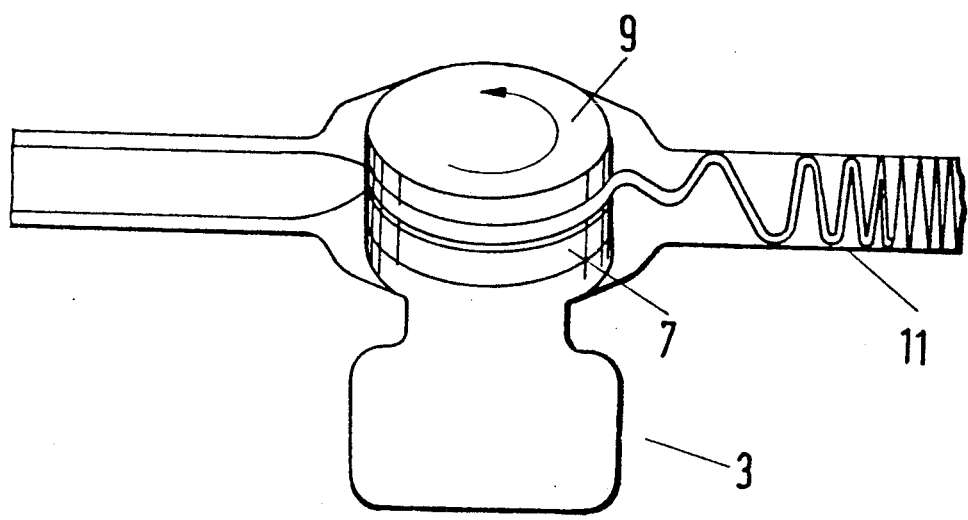
FIG. 2 is an enlarged schematic view of the high speed emulsifier of FIG. 1.

The high speed emulsifier 3 has been enlarged in FIG. 2. As shown therein, the two plates 7 and 9 are provided in the emulsifier with the lower plate 7 being fixed (i.e. non-rotating) while the upper plate rotates in the indicated direction at a speed of within the range 1400 to 1500 r.p.m. The emulsion material entering from the left in FIG. 2 and which has a temperature of approximately 35° C., is pressed into the approximately 0.6 mm wide gap between the plates where it is further emulsified and simultaneously heated to the desired temperature. In this manner, partial coagulation of the emulsion material occurs directly after the material is discharged from the emulsifier (to the right in FIG. 2). The partly coagulated material then enters the process tube 11, which has a diameter of approximately 10 cm and a length of approximately 4 m. The emulsion material passage speed within the process tube is about 1 m/min and its residence time therein is approximately 4 min.

After passing through the process tube 11, the emulsion strand is cut up at the end thereof into thin strands by a corresponding knife blade 13 and these strands are directly supplied on the belt 15 to a continuous baking oven 17. At the end of the backing process, which occurs at a core temperature of slightly above 80° C. and with a residence time in the oven of 3 min, the strands passing out of the oven 17 are cut by the cutting mechanism 19 into correspondingly dimensioned lumps and then, together with a corresponding sauce, are emptied, canned and sterilized.

EXAMPLE 2

| Formulation | % by weight |
| --- | --- |
| Meat and animal by-products | 90 |
| Vegetable protein | 5 |
| Grain products | 5 |

The process is performed in the same way as in example 1. Advantageous results with respect to product texture and taste are also obtained when the indicated percentage of vegetable proteins are utilized.

In both cases, however, the subsequent oven treatment can be omitted. The final coagulation of the product then takes place in the sterilization stage, which is performed at around 130° C.

While the preferred embodiments of the present invention have been described, it should be understood that various changes, adaptions and modifications may be made therein without departing from the spirit of the invention and the scope of the appended claims. It is intended that the appended claims be interpreted as including the foregoing as well as various other such changes and modifications.

What is claimed is:

1. A process for the production of a lumpy meat emulsion product which comprises processing starting materials having proteins of predominantly animal origin into a meat emulsion, forcing said meat emulsion through a gap between plates of a high speed emulsifier into a process tube, rapidly heating said meat emulsion in the high speed emulsifier from a temperature of 35° C. or less at the inlet thereof to a temperature between approximately 40° to 75° C. at the outlet thereof, such that relatively rapid coagulation of the emulsion material results.

2. The process according to claim 1 wherein the staring materials are processed to the meat emulsion at a temperature below 35° C.

3. The process according to claim 1 wherein the gap between the high speed emulsifier plates is set to a width of 0.2 to 2 mm.

4. A process according to claim 1 wherein the meat emulsion is heated in the high speed emulsifier to a temperature within the range of approximately 50° to 65° C.

5. A process according to claim 1 wherein the meat emulsion is heated in the high speed emulsifier by mechanical energy.

6. A process according to claim 1 wherein the speed of the emulsion material in the process tube is between 0.5 and 3 m/min with a residence time in said process tube of between approximately 20 sec. and 20 min.

7. The process according to claim 1 and further including cutting the product discharged from the process tube into strands or lumps by knife blades.

8. The process according to claim 7 and further including heating the product discharged from the process tube in an oven to a core temperature within a range of approximately 70° to 95° C.

9. The process of claim 8 wherein said oven is a continuous baking oven and the product residence time therein is within the range of approximately 1 to 10 minutes.

10. The process according to claim 8 and further including additional cutting of the product following treatment in the oven.

11. The process according to claim 1 wherein said gap between said high speed emulsifier plates is set to a width of approximately 0.6 mm.

12. The process according to claim 1 wherein the speed of the meat emulsion in the process tube is approximately 1 m/min with a residence time of between approximately 4 to 10 minutes.

13. The process according to claim 5 and further including injecting superheated steam into the high speed emulsifier to assist the heating of the meat emulsion therein.

14. The process according to claim 8 wherein the product discharged from the process tube is heated in said oven to a core temperature of approximately 80° C.

* * * * *